United States Patent [19]

Mäkinen

[11] Patent Number: 4,532,772
[45] Date of Patent: Aug. 6, 1985

[54] METHOD FOR PRODUCING MODEL ICE
[75] Inventor: Seppo Mäkinen, Espoo, Finland
[73] Assignee: Oy Wärtsilä Ab, Helsinki, Finland
[21] Appl. No.: 559,391
[22] Filed: Dec. 8, 1983
[30] Foreign Application Priority Data
Dec. 17, 1982 [FI] Finland ................................. 824363
[51] Int. Cl.$^3$ ............................................... F25C 1/00
[52] U.S. Cl. ........................................... 62/74; 114/40
[58] Field of Search ..................... 62/74, 66, 139, 140, 62/235, 532, 533; 114/40
[56] References Cited
U.S. PATENT DOCUMENTS
2,968,164  1/1961  Hanson ................................... 62/74
3,983,713  10/1976  MacCracken ......................... 62/235

Primary Examiner—Frank Sever
Attorney, Agent, or Firm—John Smith-Hill

[57] ABSTRACT

An improved method for producing an ice layer suitable for ship model ice tests on a water surface by means of a spraying process is presented. Said improvement comprises the steps of creating a low-temperature atmosphere above said water surface, forming said ice layer by spraying water freezing in said atmosphere, leading said freezing spray onto said water surface, and continuing said spraying process to form thereby the entire or at least substantially the entire ice layer on said water surface.

16 Claims, No Drawings

METHOD FOR PRODUCING MODEL ICE

The invention relates to a method for producing an ice layer suitable for ship model tests on a water surface by means of a spraying process.

Ordinary natural ice is not suitable for miniature ship model tests, because the strength that this kind of ice possesses is too great. This has caused great problems for the ice model tests and therefore attempts have been made in different ways to modify the properties of the ice in such a way that the model test ice would correspond better to the requirements determined by the scale effect. Attempts to improve the features of the model ice have been made by using salt water in the ice making process or by adding other property changing additives to the water which is to be frozen. Another method developed from this is based upon making a thin ice surface cover by means of spraying, after which a weaker layer is made under the surface layer by means of natural freezing of the solution in question. Also different kinds of heat treatment methods, so called tempering, have been used. These have a substantially increasing effect on costs and the ice manufacturing time. Completely different materials, for example wax, have also been used as model ice. No method has, however, proved satisfactory. This is because the required material properties have not been achieved. The known methods are further usually expensive, energy consuming and/or slow.

One object of the invention is to present a method, by means of which ice, well suitable for ice model tests is achieved at comparatively low costs and relatively fast. The characteristic features of the invention are, that the ice layer is achieved by spraying water drops freezing in the air onto the water surface, and that this process is continued until at least substantially the entire desired ice layer thickness is achieved. By the term "water surface" is in this case meant either the liquid water surface or alternatively the water surface when covered by a thin ice layer either partly or completely. It has been proved that the model ice producing process according to the invention can be speeded up if the water is first allowed to freeze in a natural way, so that an extremely thin ice layer is formed, the thickness of which should be as small as possible, preferably about 0.5 ... 1.0 mm. A thicker original ice layer has a detrimental effect on the properties of the model ice formed.

When applying the method according to the invention, the water drops have already converted into ice or snow particles when they reach the water surface or the snow slush layer, which is located there, and which has been produced by means of the spraying process. The further increasing of the ice thickness takes place only by means of spraying, which is the reason why no extra energy is required for this. The method is relatively fast and the desired ice layer can be accomplished in a few hours. The formed ice has at least as good properties as the best model ice materials achieved by means of known noticeably more expensive methods. Among other things the coefficient of elasticity, the bending strength, the brittleness, the uniformity and the shearing strength are noticeably more suitable for model tests compared to the corresponding properties of other model ice materials used.

Known so called snow cannons or corresponding apparatus can advantageously be used in the ice forming process according to the invention. A snow cannon usually operates by spraying a mixture of water and pressurized air, whereby the freezing at least partly takes place because of the fact that the fast expansion of the pressurized air causes a reduction in temperature. If the ambient temperature is low enough, spraying water drops which will freeze in the air can be achieved using plain water without pressurized air. The drop flight path must be long enough to ensure that the water drops have time to freeze before they reach the water surface. The minimum flight path is of course dependent on the ambient temperature and the drop size. A flight path length of at least 1 meter and a drop size of about 0.1 . . . 1.0 mm preferably 0.2 . . . 0.4 mm are recommended.

Fresh as well as salt water can be used for the spraying. The best results are usually achieved, if the water used in the ice producing process contains a small percentage of salt. A suitable water salinity is 0.5 . . . 3%. Also other ingredients can be added to the water in order to achieve the required model ice features. Suitable additives are for example carbamide, alcohol or sugar. The ambient temperature can advantageously be $-5°$ . . . $-15°$ C. Of course, it can also be below this, but that does not essentially affect the properties of the model ice produced by means of the method according to the invention. In low temperature ranges more water can however be frozen, whereby the freezing capacity of the sprayers increases and the spraying time can be made shorter.

It is important for the ice properties to keep the ice structure close as possible to that of the snow slush ice formed by means of spraying. Ice growth downwards, which takes place during the final hardening of the snow slush ice, should be prevented. This can be carried out, for example, by keeping the water below the ice flow in motion. The final hardening of the snow slush ice produced by the spraying process is achieved by keeping the ambient temperature low enough. By this is primarily meant the temperature of the air above the ice. This temperature is kept at a level of $-5°$ C. or below for at least one hour, preferably for a substantially longer time period.

As an application example of the method according to the invention can be mentioned, that in a model test laboratory, in which the temperature was $-12°$ C., in three hours there was produced a 30 mm thick ice layer over the whole surface of an about 140 m$^2$ sized model test basin. A spraying nozzle row or several rows reaching transversely over the model test basin can be used for the spraying. The rows are moved back and forward in the longitudinal direction of the basin, for example by means of apparatus moving longitudinally in the basin. This kind of apparatus is usually needed for model tests and is therefore usually available in the establishment. The spraying is continued, until the desired layer thickness at least essentially has been achieved. A faster forming of the ice can be achieved by increasing the number of spraying nozzles. Spraying tubes, in which there are spraying nozzles turning back and forward or rotating, and which are located longitudinally in the test basin can also be used.

As an example of properties of model ice produced by means of the method according to the invention can be mentioned, that the coefficient of elasticity of snow slush ice of 30 mm thickness is 15 . . . 20 MPa and the bending strength is 20 . . . 30 kPa. In the vertical direction the model ice resistance to crushing is about 35 kPa and in the horizontal ice direction about 30 kPa. The corresponding shearing strength values are about 25 kPa and 20 kPa. The properties of the ice can also be affected by varying the quality and the percentages of the ingredients added and the freezing temperature or the hardening time after the spraying.

The invention also relates to model ice produced by the application of the presented method and the use of it in model tests. When breaking, the model ice according to the invention forms smaller pieces of ice than most model ice materials. Also in many other respects the model ice according to the invention has very advantageous properties. For example the bending of such an ice field is, due to the bigger coefficient of elasticity, smaller than the bending of an ice field produced by means of freezing normal salt water.

The invention is not limited to the embodiments shown but several modifications thereof are feasible within the scope of the attached claims.

I claim:

1. A method of producing on a body of water a layer of ice suitable for ship model ice tests, comprising forming a layer of ice having physical properties for ship model ice tests by:
   (a) creating a low-temperature atmosphere over the surface of the body of water;
   (b) spraying water into the atmosphere over the water surface, in such a way that water droplets formed by the spraying freeze in the low-temperature atmosphere;
   (c) directing the freezing spray onto the water surface, so that the frozen water droplets settle onto the water surface and form ice thereon; and
   (d) continuing the spraying until substantially the entire desired thickness of the ice layer has been built up.

2. A method according to claim 1, wherein the temperature of the atmosphere created in step (a) is lower than the freezing temperature of the sprayed water.

3. A method according to claim 1, comprising forming an extremely thin layer of ice on the surface of the body of water by natural freezing before performing step (b).

4. A method according to claim 1, wherein the flight path of the sprayed water droplets is at least 1 meter.

5. A method according to claim 1, wherein the water that is sprayed in step (b) is salt water.

6. A method according to claim 5, wherein the salinity of the water sprayed in step (b) is 0.5 to 3%.

7. A method according to claim 1, wherein the layer of ice produced by steps (a), (b), (c) and (d) is hardened by:
   (e) maintaining said atmosphere at a temperature of at most $-5°$ C. for a period of at least one hour.

8. A method according to claim 7, wherein said period is at least two hours.

9. A method according to claim 1, comprising hardening the layer of ice produced by steps (a), (b), (c) and (d) and preventing further downward growth of the ice layer by agitating the water below the ice.

10. A method according to claim 1, wherein step (b) is accomplished by using expansion of pressurized gas to bring about cooling of the water spray.

11. A method according to claim 10, wherein the gas is air.

12. A method according to claim 1, wherein step (b) is accomplished by using a spray device to spray the water and expansion of pressurized gas to bring about cooling of the water spray.

13. A method according to claim 12, wherein the cooling is brought about by expansion of pressurized gas blown out through the spray device.

14. A method according to claim 12, wherein the gas is air.

15. An ice layer having physical properties suitable for ship model ice tests, said layer having been produced on the surface of a body of water beneath a low-temperature atmosphere by a method comprising causing said physical properties by spraying water into the atmosphere and onto the body of water, so that water droplets formed by the spraying freeze in the low-temperature atmosphere and settle onto the water surface and form ice thereon, and continuing the spraying to build up substantially the entire desired thickness of the ice layer.

16. A method of testing a model ship, comprising:
   (a) forming on a body of water a layer of ice having physical properties for ship model ice tests by creating a low-temperature atmosphere over the surface of the body of water, spraying water into the atmosphere over the water surface in such a way that water droplets formed by the spraying freeze in the low-temperature atmosphere, directing the freezing spray onto the water surface, so that the frozen water droplets settle onto the water surface and form ice thereon, and continuing the spraying until substantially the entire desired thickness of the ice layer has been built up; and
   (b) conducting tests on the model ship on the body of water having the layer of ice formed thereon.

* * * * *